(12) United States Patent
Ko et al.

(10) Patent No.: US 6,785,839 B2
(45) Date of Patent: Aug. 31, 2004

(54) METHOD OF VERIFYING DEFECT MANAGEMENT AREA INFORMATION OF DISC AND TEST APPARATUS FOR PERFORMING THE SAME

(75) Inventors: Jung-wan Ko, Yongin (KR); Hyun-kwon Chung, Kyungki-do (KR)

(73) Assignee: Samsung Electronics, Co., Ltd., Suwon-Si (KR)

( * ) Notice: Subject to any disclaimer, the term of this patent is extended or adjusted under 35 U.S.C. 154(b) by 559 days.

(21) Appl. No.: 09/805,447

(22) Filed: Mar. 14, 2001

(65) Prior Publication Data

US 2001/0034856 A1 Oct. 25, 2001

Related U.S. Application Data

(60) Provisional application No. 60/195,449, filed on Apr. 10, 2000.

(30) Foreign Application Priority Data

Apr. 8, 2000 (KR) .......................................... 2000-18503

(51) Int. Cl.[7] ............................................... G06F 11/00
(52) U.S. Cl. .......................................... 714/8; 711/162
(58) Field of Search ............................... 714/8, 42, 43, 714/44, 47, 54, 25, 48; 711/162, 163; 713/200, 201, 202; 369/48, 58

(56) References Cited

U.S. PATENT DOCUMENTS

| | | | | |
|---|---|---|---|---|
| 5,166,935 A | * | 11/1992 | Bish ........................... | 714/723 |
| 6,223,302 B1 | * | 4/2001 | Nakamura et al. ............. | 714/8 |
| 6,377,524 B1 | * | 4/2002 | Ko .......................... | 369/47.14 |
| 6,418,100 B1 | * | 7/2002 | Park et al. ............... | 369/47.14 |
| 6,526,522 B1 | * | 2/2003 | Park et al. ..................... | 714/8 |
| 6,564,345 B1 | * | 5/2003 | Kim et al. .................. | 714/723 |

FOREIGN PATENT DOCUMENTS

| | | |
|---|---|---|
| JP | 55-064660 | 5/1980 |
| JP | 05-307836 | 11/1993 |
| JP | 10-144011 | 5/1998 |
| JP | 2000-040308 | 2/2000 |

OTHER PUBLICATIONS

U.S. patent application Ser. No. 09/805,443, Ko et al., filed Mar. 14, 2001, Samsung Electronics Co., Ltd.
U.S. patent application Ser. No. 09/805,437, Ko et al., filed Mar. 14, 2001, Samsung Electronics Co., Ltd.
U.S. patent application Ser. No. 09/805,436, Ko et al., filed Mar. 14, 2001, Samsung Electronics Co., Ltd.
U.S. patent application Ser. No. 09/805,446, Ko et al., filed Mar. 14, 2001, Samsung Electronics Co., Ltd.
U.S. patent application Ser. No. 09/805,439, Ko et al., filed Mar. 14, 2001, Samsung Electronics Co., Ltd.
U.S. patent application Ser. No. 09/805,438, Ko et al., filed Mar. 14, 2001, Samsung Electronics Co., Ltd.
U.S. patent application Ser. No. 09/805,448, Ko et al., filed Mar. 14, 2001, Samsung Electronics Co., Ltd.
U.S. patent application Ser. No. 09/805,444, Ko et al., filed Mar. 14, 2001, Samsung Electronics Co., Ltd.

* cited by examiner

Primary Examiner—Nadeem Iqbal
(74) Attorney, Agent, or Firm—Staas & Halsey, LLP

(57) ABSTRACT

A method of verifying that defect management area (DMA) information is normally generated or updated upon reinitialization with certification in a disc recording and reproducing apparatus, and a test apparatus for performing the method. The method includes performing reinitialization with certification in a recording and reproducing apparatus using test reference information and a test disc with physical defects, generating test information from the defect management information which is generated after the reinitialization, comparing reference information expected from the test reference information and physical defects with the test information, and providing the result of verification of the test information. Accordingly, it can be easily understood whether the DMA generation or updating function is normally performed in the disc recording and reproducing apparatus in a mode of reinitialization with certification.

98 Claims, 10 Drawing Sheets

FIG. 1
PRIOR ART

| DMA1 | DDS |
| | PDL |
| | SDL |
| RESERVED | |
| DMA2 | DDS |
| | PDL |
| | SDL |
| RESERVED | |
| USER DATA AREA | |
| RESERVED | |
| DMA3 | DDS |
| | PDL |
| | SDL |
| RESERVED | |
| DMA4 | DDS |
| | PDL |
| | SDL |
| RESERVED | |

FIG. 4A

| Class | Items | | Byte Position | of bytes | Expected value |
|---|---|---|---|---|---|
| DMA | Error condition of DMA | DMA1 | NA | NA | No uncorrectable error |
| | | DMA2 | NA | NA | No uncorrectable error |
| | | DMA3 | NA | NA | No uncorrectable error |
| | | DMA4 | NA | NA | No uncorrectable error |
| | DDS/PDL and SDL Update counters | DDS/PDL update counter in DDS1 | 4 to 7 | 4 | M+k |
| | | DDS/PDL update counter in SDL1 | 16 to 19 | 4 | M+k |
| | | DDS/PDL update counter in DDS2 | 4 to 7 | 4 | M+k |
| | | DDS/PDL update counter in SDL2 | 16 to 19 | 4 | M+k |
| | | DDS/PDL update counter in DDS3 | 4 to 7 | 4 | M+k |
| | | DDS/PDL update counter in SDL3 | 16 to 19 | 4 | M+k |
| | | DDS/PDL update counter in DDS4 | 4 to 7 | 4 | M+k |
| | | DDS/PDL update counter in SDL4 | 16 to 19 | 4 | M+k |
| | | SDL update counter in SDL1 | 4 to 7 | 4 | N+k |
| | | SDL update counter in SDL2 | 4 to 7 | 4 | N+k |
| | | SDL update counter in SDL3 | 4 to 7 | 4 | N+k |
| | | SDL update counter in SDL4 | 4 to 7 | 4 | N+k |
| | Contents of DMA | DMA1 | NA | | Should be identical |
| | | DMA2 | NA | | Should be identical |
| | | DMA3 | NA | | Should be identical |
| | | DMA4 | NA | | Should be identical |

FIG. 4B

| Class | Items | | Byte Position | of bytes | Expected value | |
|---|---|---|---|---|---|---|
| DDS | DDS Identifier | | 0 to 1 | 2 | 0A0Ah | |
| | reserved | | 2 | 1 | 00h | |
| | Disc Certification flag | | 3 | 1 | b7 | 0b |
| | | | | | b6-b2 | All 0b |
| | | | | | b1 | 1b |
| | | | | | b0 | X |
| | DDS/PDL update counter | | 4 to 7 | 4 | M+k | |
| | Number of Groups | | 8 to 9 | 2 | 0001h | |
| | Number of zones | | 10 to 11 | 2 | 0023h | |
| | reserved | | 12 to 79 | 68 | All 00h | |
| | Location of Primary spare area | | 80 to 87 | 8 | b63-b56 | 00h |
| | | | | | b55-b32 | 031000h |
| | | | | | b31-b24 | 00h |
| | | | | | b23-b0 | 0341FFh |
| | Location of LSN0 | | 88 to 91 | 4 | b31-b24 | 00h |
| | | | | | b23-b0 | - |
| | reserved | | 92 to 255 | 164 | All 00h | |
| | Start LSN for each zone | Zone1 | 256 to 259 | 140 | b31-b24 | 00h |
| | | Zone2 | 260 to 263 | | b23-b0 | - |
| | | | | | b31-b24 | 00h |
| | | ... | ... | | b23-b0 | - |
| | | | | | ... | ... |
| | | Zone34 | 392 to 395 | | b31-b24 | 00h |
| | | | | | b23-b0 | - |
| | reserved | | 396 to 2047 | 1652 | All 00h | |

FIG. 4C

| Class | Items | | Byte Position | of bytes | Expected value |
|---|---|---|---|---|---|
| PDL | | PDL Identifier | 0 to 1 | 2 | 0001h |
| | | Number of entries in PDL | 2 to 3 | 2 | $E_{PDL}$ |
| | Integrity of PDL entries | First PDL entry | 4 to 7 | 4 | b31-b30 |
| | | | | | b23-b0 |
| | | Second PDL entry | 8 to 11 | 4 | b31-b30 |
| | | | | | b23-b0 |
| | | ... | ... | ... | ... |
| | | Last PDL entry | n to n+3 | 4 | b31-b30 |
| | | | | | b23-b0 |
| | | Size of PDL | | | $4 \times E_{PDL}+4$ |
| | | Un-used area | n+4 to 30719 | | FFh |

FIG. 4D

| Class | Items | | | Byte Position | of bytes | Expected value | |
|---|---|---|---|---|---|---|---|
| SDL | SDL identifier | | | 0 to 1 | 2 | 0002h | |
| | reserved | | | 2 to 3 | 2 | 00h | |
| | SDL Update counter | | | 4 to 7 | 4 | N+k | |
| | Start sector number of SSA | | | 8 to 11 | 4 | b31-b24 | 00h |
| | | | | | | b23-b0 | - |
| | Total number of logical sectors | | | 12 to 15 | 4 | | |
| | DDS/PDL Update counter | | | 16 to 19 | 4 | M+k | |
| | Spare area full flag | | | 20 | 1 | b7-b2 | All 0b |
| | | | | | | b1 | - |
| | | | | | | b0 | - |
| | reserved | | | 21 | 1 | 00h | |
| | Number of entries in SDL | | | 22 to 23 | 2 | $E_{SDL}$ | |
| | Integrity of SDL entries | First SDL entry | | 24 to 31 | 8 | b63-b56 | 00h |
| | | | | | | b55-b32 | |
| | | | | | | b23-b0 | |
| | | Second SDL entry | | 32 to 39 | 8 | b62 | |
| | | | | | | b55-b32 | |
| | | | | | | b23-b0 | |
| | | ... | | ... | ... | ... | ... |
| | | Last SDL entry | | m to m+7 | 8 | b62 | |
| | | | | | | b55-b32 | |
| | | | | | | b23-b0 | |
| | | Size of PDL | | | | $8 \times E_{SDL}+24$ | |
| | | Un-used SDL area | | m+8 to 32767 | | FFh | |

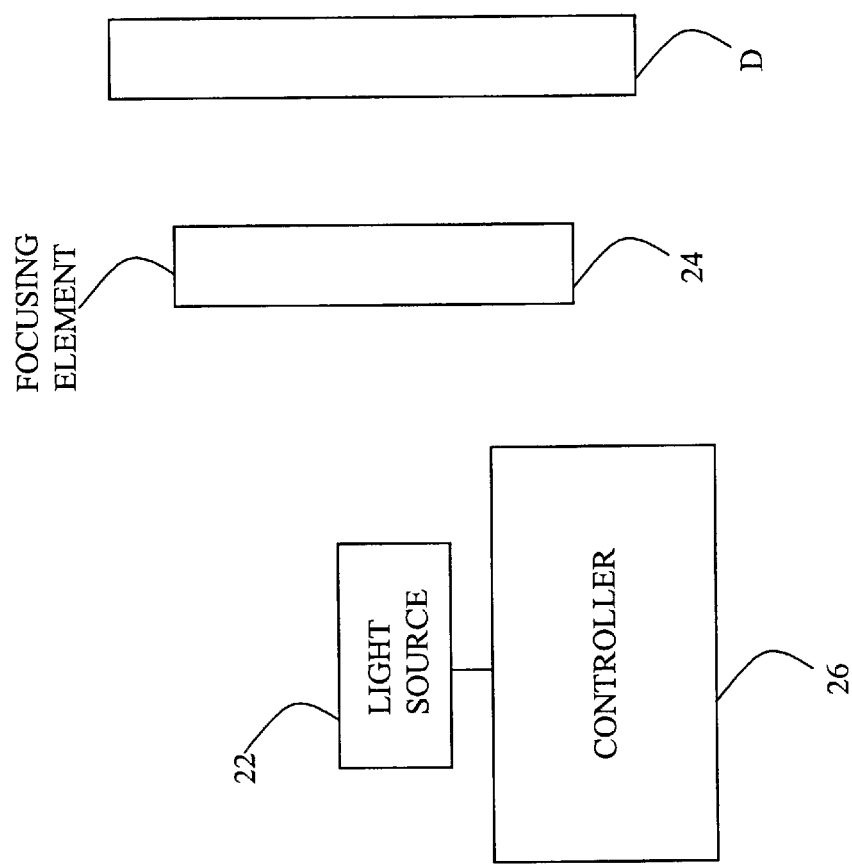

METHOD OF VERIFYING DEFECT MANAGEMENT AREA INFORMATION OF DISC AND TEST APPARATUS FOR PERFORMING THE SAME

CROSS-REFERENCE TO RELATED APPLICATIONS

This application claims the benefit of Korean Application No. 00-18503, filed Apr. 8, 2000, in the Korean Patent Office and U.S. Provisional Application No. 60/195,449, filed Apr. 10, 2000 in the U.S. Patent & Trademark Office, the disclosures of which are incorporated herein by reference.

BACKGROUND OF THE INVENTION

1. Field of the Invention

The present invention relates to an apparatus which can record information on and reproduce information from a recording and reproducing disc, and more particularly, to a method of verifying that a disc recording and reproducing apparatus normally generates or updates defect management area (DMA) information of a disc, and a test apparatus for performing the same.

2. Description of the Related Art

A recording and reproducing disc is an optical disc, which information is recorded on and reproduced from using light such as a laser beam, for example, a digital versatile disc random access memory (DVD-RAM). A DVD-RAM is a rewritable disc. According to "DVD Specifications for Rewritable Disc Part 1 Physical Specifications Version 2.0," a DVD-RAM includes four DMAs, i.e., DMA1, DMA2, DMA3 and DMA4, on each side thereof for managing the defects thereon.

As shown in FIG. 1, DMA1 and DMA2 are located in a lead-in area near the inner diameter of a disc, and DMA3 and DMA4 are located in a lead-out area near the outer diameter of the disc. Each DMA is followed by a reserved sector.

A disc definition structure (DDS), a primary defect list (PDL) and a secondary defect list (SDL) are stored in the DMA. A DDS includes information on the format structure of a disc, for example, a disc certification flag, a DDS/PDL update counter and a start logical sector number of each zone. A PDL includes information on all defective sectors detected on the disc during initialization of the disc. An SDL includes information on the sector number of each first sector in defective blocks (error-correction code (ECC) blocks) occurring while the disc is in use, information on the sector number of each first sector in spare blocks which are used to replace defective blocks and information on a spare area.

Some information included in the DMA can be immediately read and used. On the other hand, the DMA includes information which varies with the positions and the number of defects on a disc. In addition, some information, for example, the position information of the start sector number of each zone or the position information of a logical sector number 0, can be obtained by performing an algorithm based on defect information registered in the DMA.

Four DMAs exist on each side of a disc to prevent erroneous defect management due to errors in the DMA information. Since such DMA information is closely related to a physical data sector, a recording medium such as a movable optical disc may not be compatible with two different disc recording and reproducing apparatuses when the DMA information is incorrectly written or read.

This is because, when the recording and reproducing architecture of a disc recording and reproducing apparatus (for example, a DVD-RAM recording and reproducing apparatus) is divided into a file system layer, a host interface layer for interfacing a host computer with the recording and reproducing apparatus, a physical disc recording and reproducing apparatus (or disc drive) layer for recording and reproducing physical signals and a recording medium layer, writing and reading of the DMA information is performed in the physical disc recording and reproducing apparatus layer and the layers therebelow.

In an actual file system, user information to be recorded or reproduced is transmitted to a disc recording and reproducing apparatus based on only a logical sector number, and the disc recording and reproducing apparatus converts the logical sector number into a physical sector number to record or reproduce the user information. In this case, DMA information is used. Accordingly, when the DMA information has erroneously been read or written in a disc recording and reproducing apparatus, data cannot be correctly read or written in another recording and reproducing apparatus.

Accordingly, a method of verifying that a disc recording and reproducing apparatus correctly reads DMA information recorded on a disc and correctly records DMA information on the disc for generation or update of DMA information is desired.

SUMMARY OF THE INVENTION

To solve the above problem, a first object of the present invention is to provide a method of verifying that defect management area (DMA) information is normally generated or updated upon reinitialization with certification in a disc recording and reproducing apparatus.

A second object of the present invention is to provide a method of verifying that the DMA information of a disc, which is generated using a disc with physical defects and a test reference DMA mirror file configured such that every kind of defect information is included in a primary defect list, is normally generated or updated upon reinitialization with certification in a disc recording and reproducing apparatus.

A third object of the present invention is to provide a test apparatus for verifying that DMA information is normally generated or updated upon reinitialization with certification in a disc recording and reproducing apparatus.

Additional objects and advantages of the invention will be set forth in part in the description which follows and, in part, will be obvious from the description, or may be learned by practice of the invention.

To achieve the above and other objects of the invention, there is provided a method of verifying the DMA information generation or updating function of a recording and reproducing apparatus, which records information on or reproduces information from a disc with DMA information. The method includes performing reinitialization with certification in the recording and reproducing apparatus using test reference information and a test disc with physical defects and generating test information from the defect management information which is generated after the reinitialization, and comparing reference information expected from the test reference information and physical defects with the test information and providing the result of verification for the test information.

To achieve the above and other objects of the invention, there is also provided an apparatus for testing the DMA information generation or updating function of a recording and reproducing apparatus which records information on or reproduces information from a disc with DMA information.

The apparatus includes a test disc with test reference information and physical defects; a reference drive generating test information from DMA of the test disc after the recording and reproducing apparatus performs reinitialization with certification using the test disc; and a verifier comparing reference information, which is expected from the test reference information and physical defects, with the test information and verifying the test information.

BRIEF DESCRIPTION OF THE DRAWINGS

The above objects and advantages of the present invention will become more apparent by describing in detail preferred embodiments thereof with reference to the attached drawings in which:

FIG. 1 shows the schematic configuration of a rewritable disc;

FIGS. 4A through 4D are examples of detailed check lists for verification performed by the verifier of FIG. 2;

FIG. 7 is a block diagram of the drive to be tested shown in FIG. 2.

DETAILED DESCRIPTION OF THE INVENTION

Figure 2:
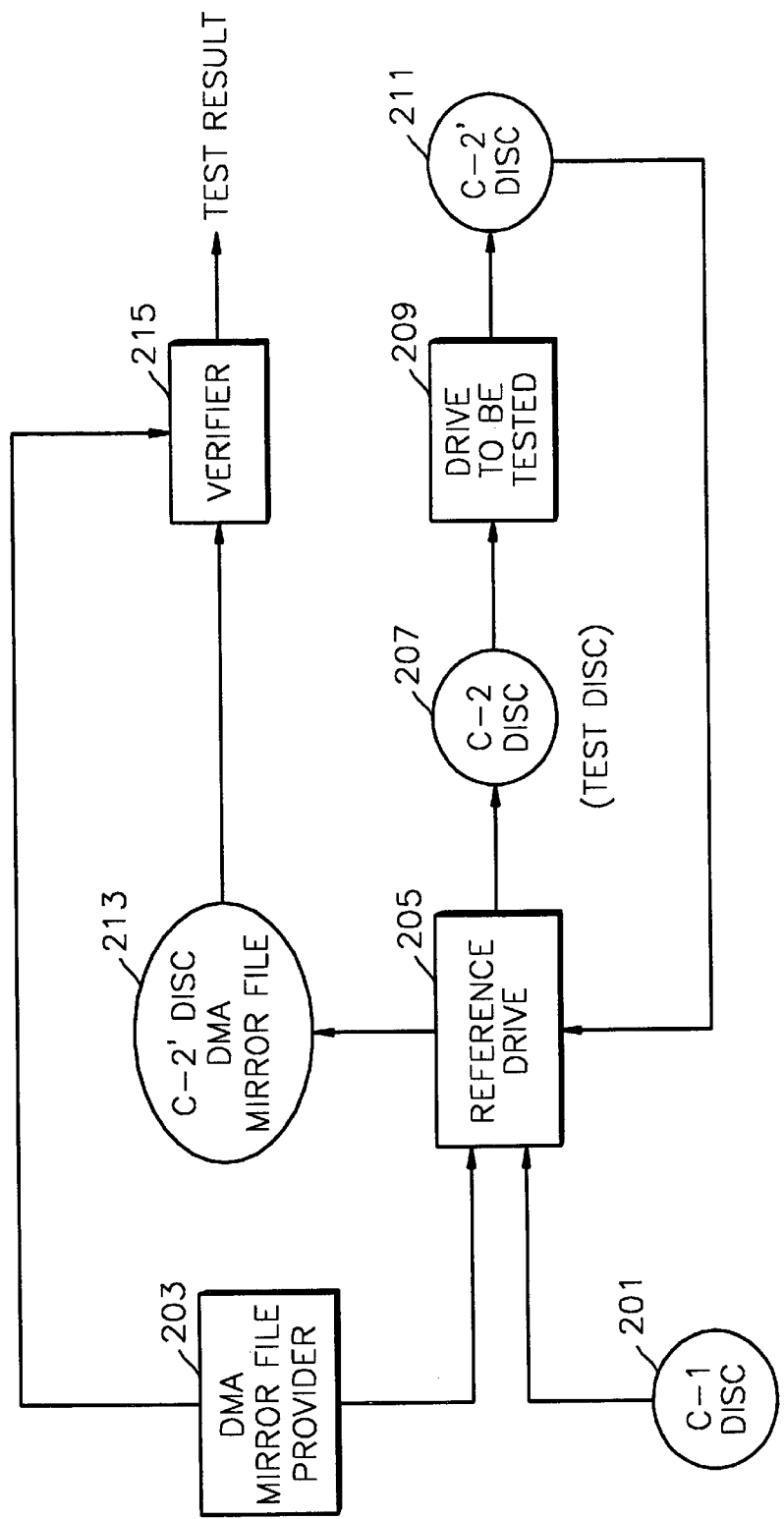
FIG. 2 is a block diagram showing the functioning of a test apparatus according to the present invention.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Referring to FIG. 2, a test apparatus includes a C-1 disc 201, a defect management area (DMA) mirror file provider 203, a reference drive 205, a C-2 disc 207, a drive to be tested 209, a C-2' disc 211, a C-2' disc DMA mirror file 213 and a verifier 215.

The C-1 disc 201 is a test disc which is made to have intentional physical defects for the purpose of testing a disc drive which can record information on or reproduce information from a rewritable disc such as a digital versatile disc random access memory (DVD-RAM). Accordingly, the physical defects on the C-1 disc 201 are used as known information when the disc drive is tested. In addition, the C-1 disc 201 is designed to satisfy conditions of a phase change recording DVD-RAM which has a capacity of 4.7 gigabytes (GB) prescribed in the "DVD Specifications for Rewritable Disc Version 2.0."

The DMA mirror file provider 203 provides a test reference DMA mirror file which is test reference information including disc definition structure (DDS) information, primary defect list (PDL) information and secondary defect list (SDL) information, as shown in FIG. 1, and satisfying a condition that a supplementary spare area (SSA) is not full.

Particularly, the DMA mirror file provider 203 provides a test reference DMA mirror file configured such that all kinds of defects are included in the PDL. In other words, the test reference DMA mirror file has the PDL, which includes a P-list with information on defective sectors defined by a disc manufacturer, a G1-list with information on defective sectors detected during certification of a disc, and a G2-list with information on defective sectors which are shifted to the SDL without certification.

Figure 3:
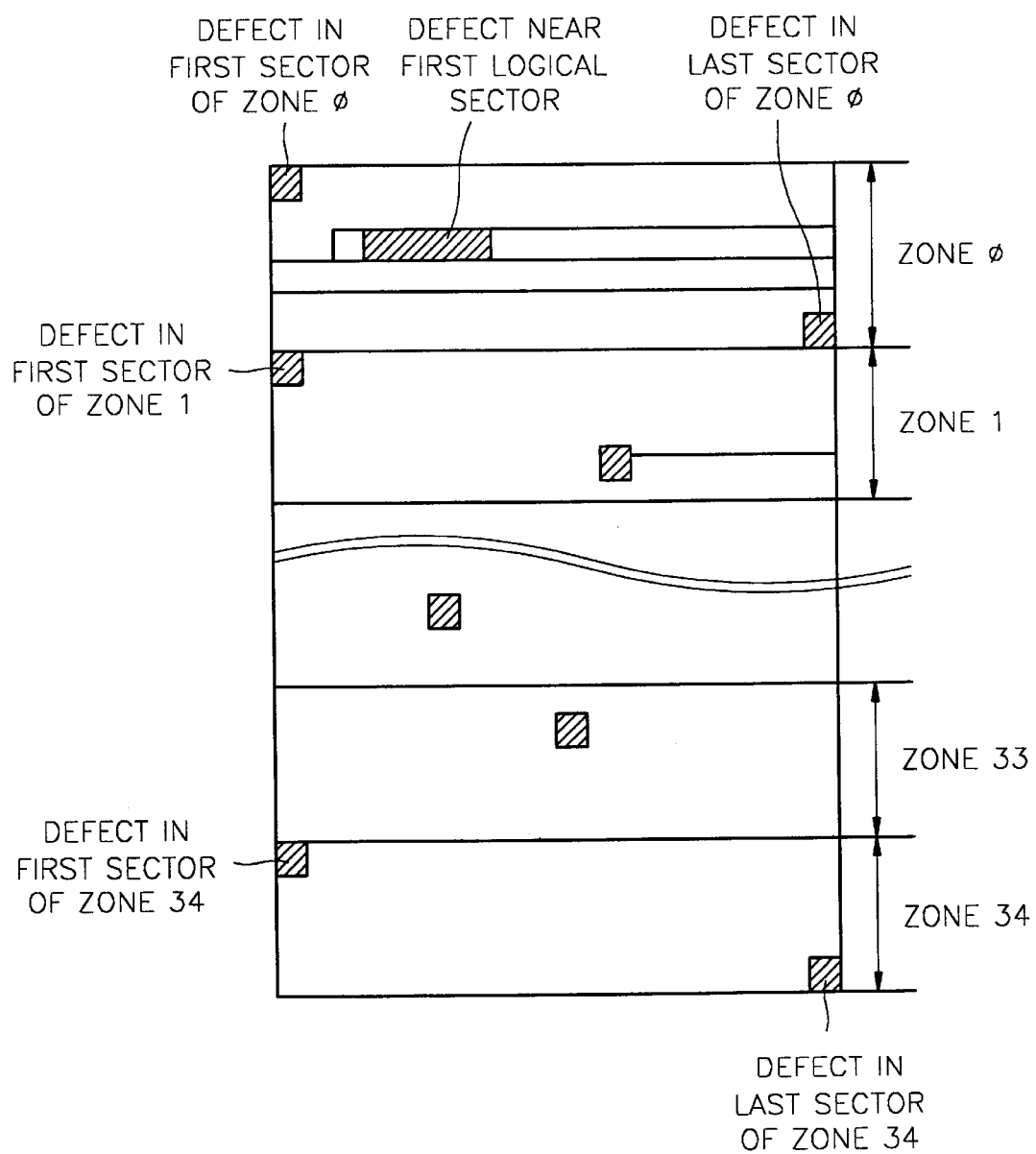
FIG. 3 shows an example of the defect structure of a C-2 disc.

To increase the effect of a test, a test reference DMA mirror file, which includes information on defects located in particular positions which have the highest possibility of occurrence of errors, is provided when the drive to be tested 209 performs reinitialization. In other words, to satisfy all cases of an algorithm which are proposed by "DVD Specifications for Rewritable Disc Part1 Physical Specifications Version 2.0," the test reference DMA mirror file is configured to include information on defects concentrated around a physical sector located where a first logical sector is supposed to be located, as shown in FIG. 3.

Also, the test reference DMA mirror file is characterized by that the first and last sectors of each zone are treated as erroneous ones and that defective sectors are set such that a total of available sectors in each zone is not a multiple of 16. A mirror file has the same content as an actual file, but is located at a position different from the physical position of the actual file.

The reference drive 205 is a modified test drive for testing an apparatus capable of recording information on and reproducing information from a disc. When the C-1 disc 201 is loaded into the reference drive 205 and the test reference DMA mirror file is provided from the DMA mirror file provider 203, the reference drive 205 records the test reference DMA mirror file on the C-1 disc 201 to generate the C-2 disc 207. The test reference DMA mirror file is recorded onto the C-1 disc 201 regardless of physical defects on the C-1 disc 201. Accordingly, the C-2 disc 207 includes the physical defects of the C-1 disc 201 and test reference DMA mirror file information which has no relation with the physical defects. Like the C-1 disc 201, the C-2 disc 207 satisfies conditions of a phase change recording DVD-RAM which has a capacity of 4.7 GB.

When the C-2' disc 211 reinitialized with certification is loaded into the reference drive 205, the reference drive 205 immediately reads the DMA information recorded on the C-2' disc 211 and outputs the C-2' disc DMA mirror file 213 based on the DMA information, as test information. The test information may be part of the C-2' disc DMA mirror file 213.

The drive to be tested 209 is a disc recording and reproducing apparatus which can record information on and reproduce information from a rewritable disc. When the C-2 disc 207 is loaded into the drive to be tested 209, the drive to be tested 209 performs reinitialization with certification, thereby generating or updating the DMA information contained in the C-2 disc 207. In other words, when the drive to be tested 209 reinitializes the C-2 disc 207 with certification, the test reference DMA information contained in the C-2 disc 207 is updated with DMA information, or new DMA information is generated, considering the physical defects on the C-1 disc 201.

Consequently, when the C-2 disc 207 is loaded into the drive to be tested 209, the drive to be tested 209 generates the C-2' disc 211 containing the generated or updated DMA information. The C-2' disc 211 is loaded into the reference drive 205, and thus the C-2' disc DMA mirror file 213 based on the DMA information recorded on the C-2' disc 211 can be output as the test information. The test information from the reference drive 205 is provided to the verifier 215. In providing the test information, the reference drive 205 may immediately provide the test information to the verifier 215.

The verifier 215 verifies the C-2' disc DMA mirror file 213 using reference information which is expected to be obtained when the drive to be tested 209 normally reads and updates the DMA information of the C-2 disc 207 during the reinitialization with certification. The reference information may be set by the verifier 215 based on the test reference DMA mirror file provided from the DMA mirror file provider 203 and the physical defect information contained in the previously provided C-1 disc 201. Alternatively, as shown in FIGS. 4A through 4D, DMA information tables may be previously prepared and used.

FIG. 4A shows a check list which the verifier 215 can include for DMA verification. The check items of the list include an error condition of DMA1 through DMA4, DDS/PDL update counters in DDS1 through DDS4 and in SDL1 through SDL4, SDL update counters in SDL1 through SDL4, and contents of DMA1 through DMA4.

The error condition of a DMA item is for checking whether errors exist in DMAs, two of which are located in a lead-in area and two of which are located in a lead-out area. Uncorrectable errors must not exist in the four DMAs, DMA1, DMA2, DMA3 and DMA4. If any uncorrectable error is detected in any one of the DMAs, the test result is output to inform the user that the drive to be tested 209 failed in generating or updating the DMA of the C-2 disc 207. When the generation or updating of DMA ends in failure, the user needs to retry the test from the beginning using another test disc.

To verify the DDS/PDL and SDL update counter items upon reinitialization with certification, the values "M+k," which indicate the values of DDS/PDL update counters in four DDSs, i.e., DDS1, DDS2, DDS3 and DDS4, and in four SDLs, i.e., SDL1, SDL2, SDL3 and SDL4, are checked to find whether the value "M" is a previous value and whether the value "k" is "2," because each DDS/PDL update counter value is increased by one when the DDS/PDL is updated or rewritten. The "previous value" means the value of "M" before the drive to be tested 209 performs the reinitialization with certification. It is also checked whether the values of the eight DDS/PDL update counters in the four DMAs, i.e., DMA1, DMA2, DMA3 and DMA4, are the same.

The values "N+k," which indicate the values of SDL update counters in four SDLs, i.e., SDL1, SDL2, SDL3 and SDL4, are checked to find whether the value "N" is a previous value and whether the value "k" is "2," because each SDL update counter value is increased by one when the SDL is updated or rewritten. The "previous value" means the value of "N" before the drive to be tested 209 performs the reinitialization with certification. It is also checked whether the values of the four SDL update counters are the same.

In addition, it is checked whether the contents of the four DMAs, i.e., DMA1, DMA2, DMA3 and DMA4, are the same.

FIG. 4B shows a check list which the verifier 215 can include for verification of the DDS. The check items of the list include a DDS identifier, a disc certification flag, a DDS/PDL update counter, a number of groups, a number of zones, a location of a primary spare area, a location of a first logical sector number (LSN0), a start LSN for each zone, etc.

It is verified that the DDS identifier is "0A0Ah." It is checked whether the value of the bit position b7, which indicates in-progress/not in-progress, in the one byte of the disc certification flag, is "0b." If the value of the bit position b7 is "0b," this indicates that formatting is completed. If the value of the bit position b7 is "1b," this indicates that formatting is in progress. Accordingly, when the value of the bit position b7 is "1b," the verifier 215 determines that formatting has failed. In addition, it is checked whether reserved bit positions b6 through b2 in the disc certification flag are all "0b," and it is checked whether the value of a bit position b1 indicating a user certification flag is "1b." It is also checked whether the value of a bit position b0 indicating a disc manufacturer certification flag is "1b."

To verify the corresponding DDS/PDL update counter, it is checked whether a value M indicating the DDS/PDL update counter value is a previous value, and whether a value k indicating an increment of the DDS/PDL update counter representing a difference in the DDS/PDL update counter "M" before and after a test is "2." It is also checked whether the value of the number of groups is "0001h" indicating that the number of groups is 1, and whether the value of the number of zones is "0023h," indicating that the number of zones is 35.

Moreover, it is checked whether the first sector number of a primary spare area is "031000h," and whether the last sector number of the primary spare area is "0341FFh." It is checked whether the location of LSN0 and the start LSN for every zone, that is, the start LSNs of the second zone, Zone1, through the 35th zone, Zone34, are determined based on the number of defects registered in PDL. The defects registered in the PDL cover the physical defects on the C-1 disc 201 and the defects registered in the PDL of the test reference DMA mirror file provided from the DMA mirror file provider 203.

It is checked whether the remaining reserved areas (byte positions 396 to 2047) in the DDS structure are all "00h."

As shown in FIG. 4C, check items for verifying the PDL structure include a PDL identifier, a number of entries in the PDL, an integrity of PDL entries and an un-used area.

It is checked whether the PDL identifier is "0001h." The number of entries in the PDL is the sum of the number of physical defects on the C-1 disc 201 and the number of defects registered in the PDL of the test reference DMA mirror file provided from the DMA mirror file provider 203. For verification of the integrity of each PDL entry, a type of entry and a defective sector number are checked. It is checked whether the PDL entry type is set to "00b" indicating a known P-list existing on the C-2 disc 207, and to "10b" indicating a G1-list of defective sectors which occur during user certification. Also, it is checked whether the defective sector numbers in PDL are written in ascending order.

Figure 5:
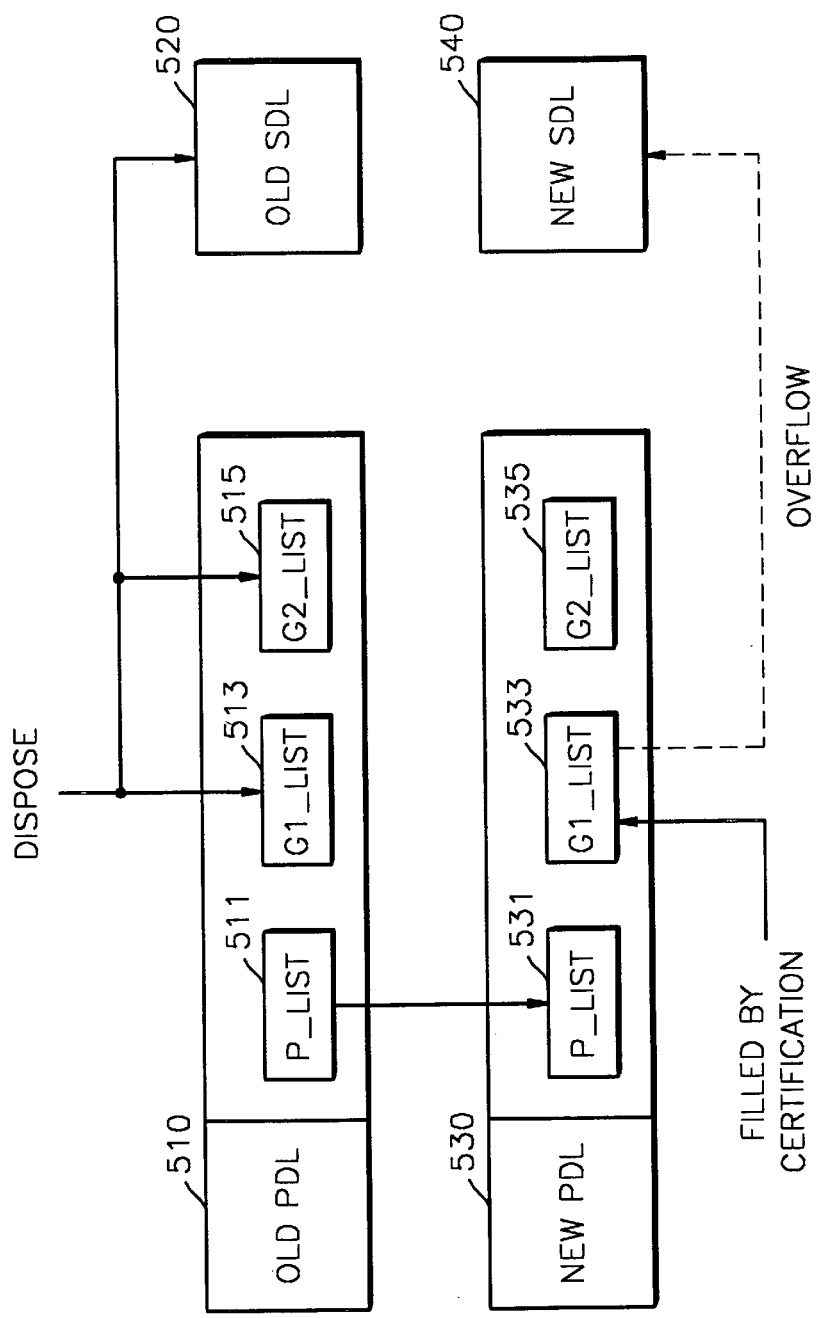
FIG. 5 is a block diagram showing the relation between a mirror file in the defect management area (DMA) of a C-2 disc before reinitialization with certification and a mirror file in the DMA of the C-2 disc after the reinitialization with certification.

When the type of entry in the PDL is checked, a G2-list is not checked because, if the drive to be tested 209 normally performs the reinitialization with certification, as shown in FIG. 5, a P_list 511 in an old PDL 510 in the DMA of the C-2 disc 207 is maintained while a G1_list 513 and a G2_list 515 are disposed of, and the C-2' disc 211 with new PDL 530 having a G1_list 533, in which defects detected from the C-2 disc 207 by certification are registered, is generated. The G1_list 533 should contain information on all defective sectors on the C-1 disc 201 to determine whether the drive to be tested 209 normally certifies the defective sectors which have purposely been made on the C-1 disc 201.

In addition, it is checked whether the un-used area is set to "FFh."

As shown in FIG. 4D, check items for verifying the SDL structure include an SDL identifier, an SDL update counter, a start sector number of a secondary spare area (SSA), a total number of logical sectors, a DDS/PDL update counter, a spare area full flag, a number of entries in SDL, an integrity of the SDL entries, an un-used area, reserved areas, etc.

It is checked whether the SDL identifier is "0002h." To verify the corresponding SDL update counter item, it is checked whether a value N indicating the SDL update counter value is a previous value, and whether a value k indicating an increment of the SDL update counter representing a difference in the SDL update counter "N" before and after a test is "2." To verify the corresponding DDS/PDL update counter item, it is checked whether a value M indicating the DDS/PDL update counter value is a previous value, and whether a value k indicating the increment of the counter is "2."

It is checked whether the spare area full flag indicates that the secondary spare area is not full, and whether the number of entries in the SDL is set to "00h," which is a value usually indicating there is none. Moreover, because the total used area of the SDL is known, if the number of entries in the SDL is checked, the size of the un-used area of the SDL can be determined. Accordingly, it is checked whether the size of the un-used area of the C-2' disc DMA mirror file 213 is equal to the size of the un-used area of the SDL, which is known based on the number of entries in the SDL, and also it is also checked whether the un-used area is set to "FFh". Also, it is checked whether the expected values of all reserved areas are "00h." This is because an old SDL 520 existing in the C-2 disc 207 is disposed of, as shown in FIG. 5, when the drive to be tested 209 normally performs the reinitialization with certification.

When the defects detected from the C-2 disc 207 by certification overflow the area assigned to the G1_list 533, excess defects are registered in new SDL 540 of the C-2' disc 211. Accordingly, when the detected defects overflow the G1_list 533, it needs to be checked whether the integrity of SDL entries includes defect information of the entry type of the G1-list.

The verifier 215 verifies whether the drive to be tested 209 normally generates or updates DMA of the C-2 disc 207 during the reinitialization with certification by comparing the reference information, which is set as shown in FIGS. 4A through 4D, with information contained in the C-2' disc DMA mirror file 213. The verified result is output as the result of testing the drive to be tested 209 in the mode of reinitialization with certification. The result may be displayed for viewing by the user. For this, the present invention may include a display unit. Therefore, the user can be informed whether the drive to be tested 209 normally reads the DMA information from a disc and generates or updates the DMA in the mode of reinitialization with certification.

Figure 6:
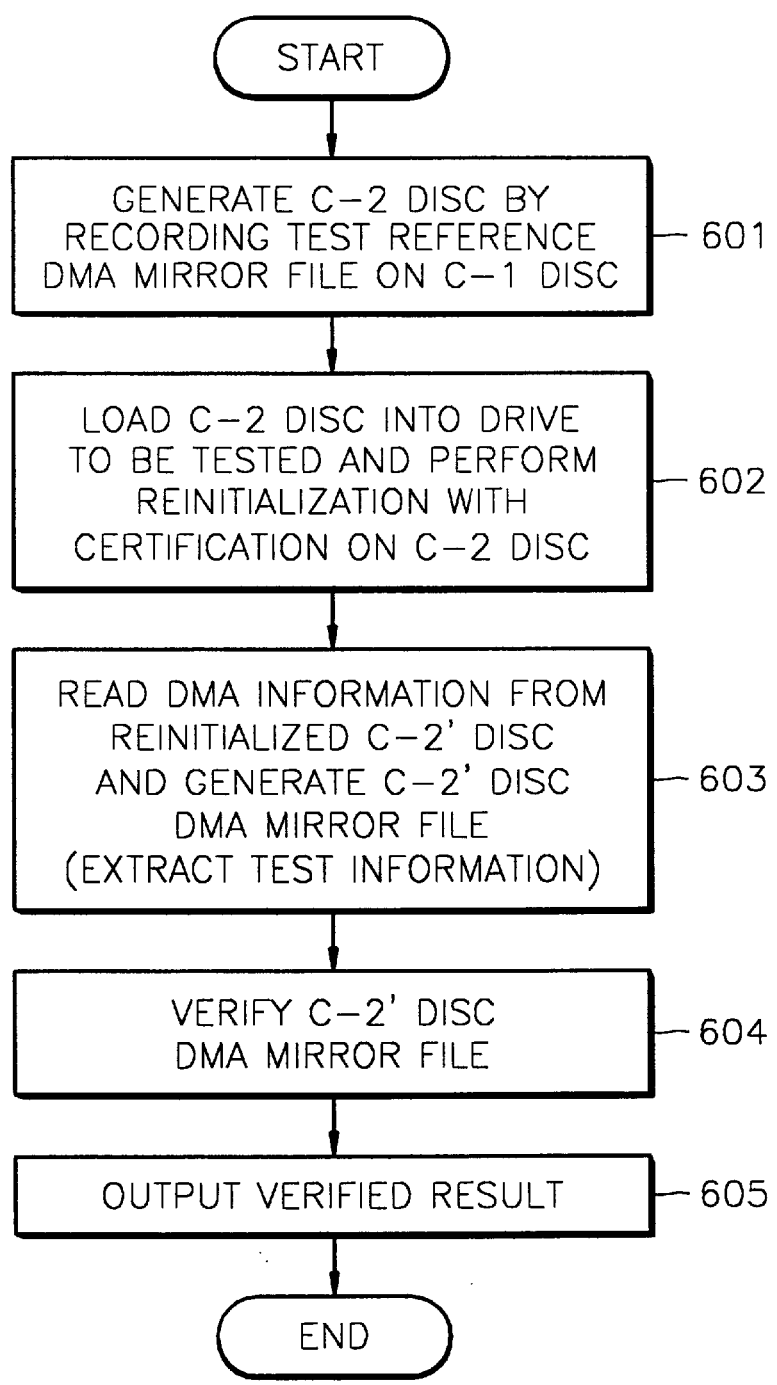
FIG. 6 is a flowchart of a verification method according to the present invention.

FIG. 6 is a flowchart of a verification method according to the present invention. The C-2 disc 207 is generated by recording the test reference DMA mirror file, which has conditions described in FIG. 2, on the C-1 disc 201, which has conditions described in FIG. 2, in operation 601. Next, in operation 602, the C-2 disc 207 is loaded into the drive to be tested 209, and the reinitialization with certification is performed on the C-2 disc 207.

In operation 603, DMA information is read from the reinitialized C-2' disc 211, and a C-2' disc DMA mirror file 213 is generated based on the DMA information. The C-2' disc DMA mirror file 213 is used as test information. At this time, part of the C-2' disc DMA mirror file 213 can be extracted as test information, as described in FIG. 2. The C-2' disc DMA mirror file 213 is verified in operation 604.

The verification is performed using expected reference information (or expected values) in the same manner as performed by the verifier 215 described in FIG. 2. After completing the verification, the result of the verification is output in operation 605 so that the user can estimate the DMA generation or updating function of the drive to be tested 209.

FIG. 7 shows the drive to be tested 110 having a light source 22 to emit light, a focusing element 24 to focus the light from the light source on a disc D, and a controller 26 which controls the light source 22. The verification process described above seeks to verify the proper operation of the controller 26.

As described above, the present invention performs reinitialization with certification on a C-2 disc, which is generated using a C-1 disc having known physical defects and a test reference DMA mirror file, in which a PDL includes all kinds of defects by having a P-list, G1-list and G2-list, in a drive to be tested. Test information based on a C-2' disc DMA mirror file, which is obtained after the reinitialization with certification of the C-2 disc, is verified to obtain the result of testing the drive to be tested for DMA reading and recording functions. Accordingly, the DMA generation or updating function of a drive, which can record and reproduce information on and from a disc, can be conveniently tested. The present invention uses a test reference DMA mirror file, which satisfies the conditions having the highest possibility of errors occurring, when performing the reinitialization, thereby performing the verification and test which satisfies all cases of an algorithm which are proposed in "DVD Specifications for Rewritable Disc Part1 Physical Specifications Version 2.0."

In addition, the user may personally produce the C-2 disc, in which the PDL includes the P-list, G1-list and G2-list, using the test reference DMA mirror file, thereby reducing the cost by not requiring a manufacturer to produce and provide a test disc as the C-2 disc. The user can produce the C-2 disc using the reference drive 205, the DMA mirror file provider 203, and the C-1 disc 201.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of verifying a defect management area (DMA) information generation or updating function of a recording and reproducing apparatus, which records information on or reproduces information from a disc with DMA information, the method comprising:

performing reinitialization with certification in the recording and reproducing apparatus using test reference information and a test disc with physical defects and generating test information from the DMA information which is generated after the reinitialization; and comparing reference information expected from the test reference information and physical defects with the test information to provide a result of verification of the test information.

2. The method of claim 1, wherein the test disc includes defect information on locations satisfying conditions in which an error readily occurs during the reinitialization with certification.

3. The method of claim 1, wherein the test disc comprises first and last sectors of each zone which are treated as erroneous sectors, and a total number of available sectors in each zone is not a multiple of 16.

4. The method of claim 1, wherein the test reference information in the performing of the reinitialization with certification is a mirror file.

5. The method of claim 1, wherein the test reference information in the performing of the reinitialization with certification is a DMA mirror file.

6. The method of claim 1, wherein the test reference information in the performing of the reinitialization with certification is a DMA mirror file configured such that a plurality of kinds of defects are included in a primary defect list (PDL).

7. The method of claim 6, wherein the expected reference information in the comparing is set based on information of the DMA mirror file and the physical defect information when the reinitialization with certification is normally performed on the test disc in the recording and reproducing apparatus.

8. The method of claim 6, wherein the PDL comprises a P-list including information on defective sectors defined by a disc manufacturer, a G1-list including information on defective sectors detected during the certification, and a G2-list including information on defective sectors moved from a secondary defect list (SDL) in the DMA mirror file without certification.

9. The method of claim 8, wherein the comparing comprises checking whether the G1-list, the G2-list and the SDL included in the DMA mirror file are deleted from the test information.

10. The method of claim 8, wherein the comparing comprises checking whether the P-list is maintained, whether intentional defective sectors existing on the test disc are included in the G1-list, and whether no SDL entries exist.

11. The method of claim 6, wherein the test information generated in the performing of the reinitialization with certification is a mirror file.

12. The method of claim 11, wherein the comparing comprises:
verifying a structure of DMA of the test information;
verifying a disc definition structure (DDS) of the test information;
verifying a primary defect list (PDL) structure of the test information; and
verifying a secondary defect list (SDL) structure of the test information.

13. The method of claim 12, wherein the verifying of the DMA structure comprises checking a DMA error condition, DDS/PDL and SDL update counters and the contents of the DMA.

14. The method of claim 13, wherein:
the checking the DMA error condition comprises checking whether errors exist in any one of four DMAs, which is the DMA written in four positions on the test disc, two of which are located in a lead-in area and two of which are located in a lead-out area on the test disc;
the checking the DDS/PDL update counters comprises checking whether values of the DDS/PDL update counters in four DDSs and in four SDLs are "previous values," whether increments of the DDS/PDL update counters representing a difference in the DDS/PDL update counters before and after the performing of the reinitialization with certification are "2," and whether the values of the DDS/PDL update counters are the same;

the checking the SDL update counters comprises checking whether values of the SDL update counters in the four SDLs are "previous values," whether increments of the SDL update counters representing a difference in the SDL update counters before and after the performing of the reinitialization with certification are "2," and whether the values of the SDL update counters are the same; and the checking the contents of the DMA comprises checking whether the contents of the four DMAs are the same.

15. The method of claim 12, wherein the verifying of the DDS comprise checking a DDS identifier, a disc certification flag, a DDS/PDL update counter, a number of groups, a number of zones, a location of a primary spare area, a location of a first logical sector number and a start logical sector number for each zone.

16. The method of claim 15, wherein:
the checking the DDS identifier comprises checking whether the DDS identifier is a predetermined value;
the checking the disc certification flag comprises checking whether a value of a bit indicating in-progress in the disc certification flag is "0b" and whether a value of a bit indicating disc manufacturer certification and a value of a bit indicating user certification are "1b";
the checking the DDS/PDL update counter comprises checking whether the DDS/PDL update counter value is a "previous value" and whether an increment of the DDS/PDL update counter representing a difference in the DDS/PDL update counter before and after the performing of the reinitialization with certification is "2";
the checking the number of groups comprises checking whether the number of groups is a predetermined number;
the checking the number of zones comprises checking whether the number of zones is a predetermined number;
the checking the location of the primary space area comprises checking whether the first and last sector numbers of the primary spare area are predetermined sector numbers, respectively;
the checking the first logical sector number comprises checking whether the location of the first logical sector number is determined based on a number of defects registered in the PDL; and
the checking the start logical sector number comprises checking whether the start logical sector number for each zone is determined based on the number of defects registered in the PDL.

17. The method of claim 12, wherein the verifying of the PDL structure comprises checking a PDL identifier, a number of entries in the PDL and an integrity of the PDL entries.

18. The method of claim 17, wherein:
the checking the PDL identifier comprises checking whether the PDL identifier is a predetermined value;
the checking the number of entries comprises checking whether the number of entries in the PDL is the same as a number of defects registered in the PDL; and
the checking the integrity of the PDL entries comprises checking whether the integrity of the PDL entries comprises a P-list in the DMA on the test disc and a G1-list of defects detected during user certification.

19. The method of claim 12, wherein the verifying of the SDL structure comprises checking an SDL identifier, an SDL update counter, a start sector number of a secondary spare area (SSA), a total number of logical sectors, a DDS/PDL update counter, a spare area full flag, a number of entries in the SDL, an integrity of the SDL entries, an un-used area and reserved areas.

20. The method of claim 19, wherein:
the checking the SDL identifier comprises checking whether the SDL identifier is a predetermined value;
the checking the SDL update counter comprises checking whether the SDL update counter value is a "previous value" and whether an increment of the SDL update counter representing a difference in the SDL update counter before and after the performing of the reinitialization with certification is "2";
the checking the DDS/PDL update counter comprises checking whether the DDS/PDL update counter value is a "previous value" and whether an increment of the DDS/PDL update counter representing a difference in the DDS/PDL update counter before and after the performing of the reinitialization with certification is "2";
the checking the start sector number of the SSA and the total number of logical sectors comprises checking whether the start sector number of the SSA and the total number of logical sectors are properly set according to a size of the SSA which is designated by a user;
the checking the spare area full flag, the number of entries in the SDL and the integrity of the SDL entries comprises checking whether the spare area full flag indicates that the SSA is not full, whether the number of entries in the SDL is set to "00h" indicating that no entries exist, and whether no information on the SDL entries exists; and
the checking the un-used area and the reserved areas comprises checking a size of the un-used area of the SDL and whether the un-used area is a predetermined value, and whether the reserved areas are predetermined values.

21. The method of claim 19, wherein:
the checking the SDL identifier comprises checking whether the SDL identifier is a predetermined value;
the checking the SDL update counter comprises checking whether the SDL update counter value is a "previous value" and whether an increment of the SDL update counter representing a difference in the SDL update counter before and after the performing of the reinitialization with certification is "2";
the checking the DDS/PDL update counter comprises checking whether the DDS/PDL update counter value is a "previous value" and whether an increment of the DDS/PDL counter representing a difference in the DDS/PDL update counter before and after the performing of the reinitialization with certification is "2";
the checking the start sector number of the SSA and the total number of logical sectors comprises checking whether the start sector number of the SSA and the total number of logical sectors are properly set according to a size of the SSA which is designated by a user;
the checking the spare area full flag, the number of entries in the SDL and the integrity of the SDL entries comprises checking whether the spare area full flag indicates that the SSA is not full and whether G1-list items are registered in the SDL when defects detected during the certification overflow an area assigned to the G1-list of the PDL; and
the checking the un-used area and the reserved areas comprises checking a size of the un-used area of the SDL and whether the un-used area is a predetermined value, and whether the reserved areas are predetermined values.

22. The method of claim 1, further comprising recording the test reference information on the test disc having the physical defects regardless of the physical defects to generate the test disc.

23. The method of claim 1, wherein the generating of the test information comprises directly reading the test information from the DMA on the test disc reinitialized with certification.

24. The method of claim 1, further comprising displaying the verified result as a result of testing the DMA generation or updating function of the recording and reproducing apparatus.

25. An apparatus for testing a defect management area (DMA) information generation or updating function of a recording and reproducing apparatus which records information on or reproduces information from a disc with DMA information, the apparatus comprising:
a reference drive generating test information from a DMA of a test disc with test reference information and physical defects after the recording and reproducing apparatus performs reinitialization with certification on the test disc; and
a verifier comparing reference information, which is expected from the test reference information and physical defects, with the test information and verifying the test information.

26. The apparatus of claim 25, wherein the test reference information is a DMA mirror file.

27. The apparatus of claim 25, wherein the reference drive records the test reference information on a disc having the physical defects regardless of the physical defects to generate the test disc.

28. The apparatus of claim 25, wherein the test disc comprises defect information on locations satisfying conditions in which an error readily occurs when the recording and reproducing apparatus performs the reinitialization.

29. The apparatus of claim 28, wherein the test disc comprises first and last sectors of each zone which are treated as erroneous sectors, and total number of available sectors in each zone is not a multiple of 16.

30. The apparatus of claim 25, wherein the test reference information is a DMA mirror file in which a plurality of kinds of defects are included in a primary defect list (PDL).

31. The apparatus of claim 30, wherein the PDL comprises a P-list including information on defective sectors defined by a disc manufacturer, a G1-list including information on defective sectors detected during the certification, and a G2-list including information on defective sectors moved from a secondary defect list (SDL) in the DMA mirror file without certification.

32. The apparatus of claim 31, wherein the verifier checks whether the G1-list, the G2-list and the SDL included in the test reference information are disposed of in the test information.

33. The apparatus of claim 31, wherein the verifier checks whether the physical defects existing on the test disc and intentional defects are included in the G2-list in the DMA on the test disc which has undergone reinitialization.

34. The apparatus of claim 30, wherein the test information generated by the reference drive is a mirror file.

35. The apparatus of claim 34, wherein the verifier verifies a DMA structure, a disc definition structure (DDS), a primary defect list (PDL) structure and a secondary defect list (SDL) structure in the test information.

36. The apparatus of claim 35, wherein the verifier verifies the DMA structure by checking an error condition of the DMA, DDS/PDL and SDL update counters and contents of the DMA.

37. The apparatus of claim 36, wherein the verifier checks whether errors exist in any one of four DMAs, which is the DMA written in four positions on the test disc, two of which are located in a lead-in area and two of which are located in a lead-out area on the test disc, whether the values of DDS/PDL update counters in four DDSs and in four SDLs are "previous values," whether increments of DDS/PDL update counters are representing a difference in the DDS/PDL update counters before and after the performing of the reinitialization with certification "2," whether the values of the DDS/PDL update counters are the same, whether values of the SDL update counters in the four SDLs are "previous values," whether increments of the SDL update counters representing a difference in the SDL update counters before and after the performing of the reinitialization with certification are "2," whether the values of the SDL update counters are the same, and whether contents of the four DMAs are the same.

38. The apparatus of claim 35, wherein the verifier verifies the DDS by checking a DDS identifier, a disc certification flag, a DDS/PDL update counter, a number of groups, a number of zones, a location of a primary spare area, a location of a first logical sector number and a start logical sector number for each zone.

39. The apparatus of claim 38, wherein the verifier checks whether the DDS identifier is a predetermined value, whether a value of a bit indicating in-progress in the disc certification flag is "0," whether a value of a bit indicating disc manufacturer certification and a value of a bit indicating user certification are "1b," whether the DDS/PDL update counter value is a "previous value" and whether increment of the DDS/PDL update counter is "2," checks the number of groups, the number of zones and first and last sector numbers of the primary spare area, and checks whether the location of the first logical sector number is determined based on a number of defects registered in the PDL and whether the start logical sector number for each zone is determined based on the number of defects registered in the PDL.

40. The apparatus of claim 35, wherein the verifier verifies the PDL structure by checking a PDL identifier, a number of entries in the PDL and an integrity of the PDL entries.

41. The apparatus of claim 40, wherein the verifier verifies the PDL structure by checking the PDL identifier and checks whether the number of entries in the PDL is the same as a number of defects registered in the PDL and whether the integrity of PDL entries comprises a P-list in the DMA on the test disc and a G1-list of defects detected during user certification.

42. The apparatus of claim 35, wherein the verifier verifies the SDL structure by checking an SDL identifier, an SDL update counter, a start sector number of a secondary spare area (SSA), a total number of logical sectors, a DDS/PDL update counter, a spare area full flag, a number of entries in the SDL, an integrity of the SDL entries, an un-used area and reserved areas.

43. The apparatus of claim 42, wherein the verifier checks whether the SDL identifier is a predetermined value and checks whether the SDL update counter value is a "previous value," whether an increment of the SDL update counter representing a difference in the SDL update counter before and after the performing of the reinitialization with certification is "2," whether the DDS/PDL update counter value is a "previous value," whether the increment of the DDS/PDL update counter representing a difference in the DDS/PDL update counter before and after the performing of the reinitialization with certification is "2," whether the start sector number of the SSA and the total number of logical sectors are properly set according to a size of a SSA which is designated by a user, whether the spare area full flag indicates that the secondary spare area is not full, whether the number of entries in the SDL is set to "00h" indicating that no entries exist, whether no information on the SDL entries exists, a size of the un-used area of the SDL and whether the un-used area is a predetermined value, and whether the reserved areas are predetermined values.

44. The apparatus of claim 42, wherein the verifier verifies the SDL structure by checking the SDL identifier and checking whether the SDL update counter value is a "previous value," whether the increment of the SDL update counter representing a difference in the SDL update counter before and after the performing of the reinitialization with certification is "2," whether the DDS/PDL update counter value is a "previous value," whether an increment of the DDS/PDL update counter representing a difference in the DDS/PDL update counter before and after the performing of the reinitialization with certification is "2," whether the start sector number of the SSA and the total number of logical sectors are properly set according to the size of the SSA which is designated by a user, whether the spare area full flag indicates that the SSA is not full, whether G1-list items are registered in the SDL when defects detected during the certification overflow an area assigned to the G1-list of the PDL, a size of the un-used area of the SDL and whether the un-used area is a predetermined value, and whether the reserved areas are predetermined values.

45. The apparatus of claim 25, wherein the reference drive directly reads the test information from the DMA on the test disc reinitialized with certification.

46. The apparatus of claim 25, further comprising a display displaying the verified result as a result of testing the DMA generation or updating function of the recording and reproducing apparatus.

47. A method of verifying whether defect management area (DMA) information is properly generated or updated in a recording and reproducing apparatus which records or reproduces information on or from an optical disc with the DMA information, the method comprising:

setting a test reference according to a reinitialization with certification mode test mode;

generating test information from the DMA information, which is generated or updated by the recording and reproducing apparatus, according to the reinitialization with certification test mode; and executing a test for verifying the test information using the test reference in the reinitialization test mode.

48. The method of claim 47, wherein the test information is a DMA mirror file.

49. The method of claim 47, wherein the test information is directly read from a DMA area on a disc used for a test.

50. The method of claim 47, wherein the generating of the test information comprises recording pre-fixed contents of a DMA and selecting a DMA mirror file, in which the supplementary spare area is not full.

51. The method of claim 50, further comprising:

obtaining a first test disc by forming known physical defects on a blank disc; and obtaining a second test disc by recording pre-fixed contents of a DMA in the first test disc, and recording a mirror file indicating that the supplementary spare area is not full in the first test disc, and using the second test disc in generating the test information.

52. The method of claim 51, wherein the executing of the test comprises performing the reinitialization with certification, checking whether the DMA information of the second test disc complies with a predetermined DMA structure, checking whether a P-list is maintained, checking a list of defects which are the same as the known defects of the first test disc, and checking the start logical sector number of each zone of the second test disc.

53. A method of verifying whether defect management area (DMA) information is properly generated or updated in a recording and reproducing apparatus which records or reproduces information on or from an optical disc with the DMA information, the method comprising:

generating test information from the DMA information, which is generated or updated by the recording and reproducing apparatus, according to a reinitialization with certification test mode; and verifying the test information using a test reference for verifying the DMA information.

54. The method of claim 53, wherein the test information is a DMA mirror file.

55. An apparatus for testing a recording and reproducing apparatus which records or reproduces information on or from a recordable and reproducible optical disc with defect management area (DMA) information to check whether the DMA information is properly generated or updated, the apparatus comprising:

a modified drive unit generating test information from the generated or updated DMA information of a test disc, which is obtained after the recording and reproducing apparatus performs reinitialization with certification on the test disc with a DMA mirror file corresponding to the reinitialization with certification; and a verifier comparing the test information with predetermined test information corresponding to the reinitialization with certification to verify a test result.

56. The apparatus of claim 55, wherein the test information is a DMA mirror file.

57. The apparatus of claim 55, wherein the modified drive unit reads the test information from a DMA area on the test disc and provides the test information to the verifier.

58. The apparatus of claim 57, wherein the test disc is a second test disc on which pre-fixed contents of a DMA are recorded in a first test disc on which known physical defects are formed on a blank disc, and on which a mirror file that the supplementary spare area is not full is recorded.

59. The apparatus of claim 58, wherein the verifier checks whether the DMA information of the second test disc complies with a predetermined DMA structure and whether a P-list is maintained, and checks a list of defects which are the same as the known defects and the start logical sector number of each zone of the second test disc.

60. A method of verifying whether a recording and reproducing apparatus reads and processes defect management area (DMA) information properly, comprising:

performing reinitialization with certification on a test disc containing predetermined defect information using the reproducing and recording apparatus to generate test information; and comparing the test information with reference test information to determine a verification of the recording and reproducing apparatus.

61. The method of claim 60, further comprising:

making known physical defects at predetermined positions in a blank disc, to produce a first test disc;

obtaining a second test disc by recording pre-fixed contents of a DMA in the first test disc, and recording a mirror file indicating that a supplementary spare area is not full in the first test disc;

having the recording and reproducing apparatus perform the reinitialization with certification on the second test disc, to generate a second test disc with the DMA information; and reading only the DMA information from the second test disc with the DMA information using a reference drive, to generate a test DMA mirror file as the test information;

wherein the reference test information is a reference DMA mirror file.

62. The method of claim 61, wherein the comparing comprises checking whether the DMA information of the second test disc complies with a predetermined DMA structure, checking whether a P-list is maintained, checking a list of defects which are the same as the known defects of the first test disc, and checking the start logical sector number of each zone of the second test disc.

63. A method of verifying whether a recording and reproducing apparatus properly translates and processes defect information, the method comprising:

preparing a test disc having known physical defects and a test reference DMA mirror file;

generating test information based on having the recording and reproducing apparatus perform reinitialization with certification on the test disc; and conducting a verification test on the test information.

64. The method of claim 63, wherein the test reference DMA mirror file comprises information on defects concentrated around a physical sector located where a first logical sector is supposed to be located.

65. The method of claim 64, wherein the test reference DMA mirror file comprises first and last sectors of each zone which are treated as erroneous sectors, and defective sectors are set such that a total of available sectors in each zone is not a multiple of 16.

66. A method of verifying whether a recording and reproducing apparatus reads and processes defect management area (DMA) information properly, comprising:

performing reinitialization with certification on a test disc having known physical defects and a test reference DMA mirror file using the reproducing and recording apparatus to generate the DMA information;

generating test information from the generated DMA information; and comparing the test information with reference test information to determine a verification of the recording and reproducing apparatus.

67. The method of claim 66, wherein the test reference DMA mirror file comprises information on defects concentrated around a physical sector located where a first logical sector is supposed to be located.

68. The method of claim 67, wherein the test reference DMA mirror file comprises first and last sectors of each zone which are treated as erroneous sectors, and defective sectors are set such that a total of available sectors in each zone is not a multiple of 16.

69. The method of claim 64, wherein the comparing comprises checking a structure of a DMA, a disc definition structure (DDS) of the DMA, a primary defect list (PDL) structure and a secondary list (SDL) structure of the DMA, which form the test information.

70. DMA information which is properly generated by a recording and reproducing apparatus using the process of:
performing reinitialization with certification on a test disc containing known physical defects and a test reference DMA mirror file using the reproducing and recording apparatus to generate the DMA information;
generating test information from the generated DMA information; and
comparing the test information with reference test information to determine a verification of the recording and reproducing apparatus.

71. The DMA information of claim 70, wherein the test reference DMA mirror file comprises information on defects concentrated around a physical sector located where a first logical sector is supposed to be located.

72. The DMA information of claim 71, wherein the test reference DMA mirror file comprises first and last sectors of each zone which are treated as erroneous sectors, and defective sectors are set such that a total of available sectors in each zone is not a multiple of 16.

73. The DMA information of claim 70, wherein the comparing comprises checking a structure of a DMA, a disc definition structure (DDS) of the DMA, a primary defect list (PDL) structure and a secondary list (SDL) structure of the DMA, which form the test information.

74. A recording and reproducing apparatus verified according to the process of:
performing reinitialization with certification on a test disc containing known physical defects and a test reference DMA mirror file using the reproducing and recording apparatus to generate the DMA information;
generating test information from the generated DMA information; and
comparing the test information with reference test information to determine a verification of the recording and reproducing apparatus.

75. The recording and reproducing apparatus of claim 74, wherein the test reference DMA mirror file comprises information on defects concentrated around a physical sector located where a first logical sector is supposed to be located.

76. The recording and reproducing apparatus of claim 75, wherein the test reference DMA mirror file comprises first and last sectors of each zone which are treated as erroneous sectors, and defective sectors are set such that a total of available sectors in each zone is not a multiple of 16.

77. The recording and reproducing apparatus of claim 74, wherein the comparing comprises checking a structure of a DMA, a disc definition structure (DDS) of the DMA, a primary defect list (PDL) structure and a secondary list (SDL) structure of the DMA, which form the test information.

78. A recording and reproducing apparatus verified according to the process of:
performing reinitialization with certification on a test disc containing known physical defects and a test reference DMA mirror file using the reproducing and recording apparatus to generate the DMA information; and
comparing the test information with reference test information to determine a verification of the recording and reproducing apparatus.

79. The recording and reproducing apparatus of claim 78, wherein the test reference DMA mirror file comprises information on defects concentrated around a physical sector located where a first logical sector is supposed to be located.

80. The recording and reproducing apparatus of claim 79, wherein the test reference DMA mirror file comprises first and last sectors of each zone which are treated as erroneous sectors, and defective sectors are set such that a total of available sectors in each zone is not a multiple of 16.

81. The recording and reproducing apparatus of claim 78, wherein the comparing comprises checking a structure of a DMA, a disc definition structure (DDS) of the DMA, a primary defect list (PDL) structure and a secondary list (SDL) structure of the DMA, which form the test information.

82. An apparatus for testing a recording and reproducing apparatus which records or reproduces information on or form a recordable and reproducible optical disc with defect management area information to check whether DMA information is properly generated, the apparatus comprising:
a modified driver generating test information based on the DMA information of a test disc generated by a reproducing device performing reinitialization with certification on the test disc containing known physical defects and a test reference DMA mirror file using the reproducing and recording apparatus to generate the DMA information; and
a verifier comparing the test information with reference test information to determine a verification of the recording and reproducing apparatus.

83. The apparatus of claim 82, wherein the modified driver reads only the DMA information from the test disc with the DMA information, to generate a DMA mirror file as the test information;
wherein the reference test information is a reference DMA mirror file.

84. The apparatus of claim 82, wherein the modified driver generates a second test disc by recording pre-fixed contents of a DMA on a first test disc having known physical defects, and recording a test reference DMA mirror file indicating that the supplementary spare area is not full in the first test disc;
the recording and reproducing apparatus performs the reinitialization with certification on the second test disc, to generate a second test disc with the DMA information; and
the modified driver reads only the DMA information from the second test disc with the DMA information, to generate a test DMA mirror file as the test information;
wherein the reference test information is a reference DMA mirror file.

85. The apparatus of claim 84, wherein the verifier checks whether the DMA information of the second test disc complies with a predetermined DMA structure, checks whether a P-list is maintained, checks a list of defects which are the same as the known defects of the first test disc, and checks the start logical sector number of each zone of the second test disc.

86. The apparatus of claim 82, wherein the verifier compares the test information and the reference test information by checking a structure of a DMA, a disc definition structure (DDS) of the DMA, a primary defect list (PDL) structure and a secondary list (SDL) structure of the DMA, which form the test information.

87. The apparatus of claim 82, wherein the test reference DMA mirror file comprises information on defects concentrated around a physical sector located where a first logical sector is supposed to be located.

88. The apparatus of claim 87, wherein the test reference DMA mirror file comprises first and last sectors of each zone which are treated as erroneous sectors, and defective sectors are set such that a total of available sectors in each zone is not a multiple of 16.

89. The apparatus of claim 55, further comprising a DMA mirror file provider which provides the reference test information to the verifier to make the comparison between the test information and the reference test information.

90. The recording and reproducing apparatus of claim 74, further comprising a DMA mirror file provider which provides the reference test information to the verifier to make the comparison between the DMA mirror file and the reference DMA mirror file.

91. A method of manufacturing a compliant recording and reproducing apparatus, comprising:
   manufacturing an uncertified recording and reproducing apparatus that updates and generates defect management area (DMA) information; and
   verifying whether the uncertified recording and reproducing apparatus is compliant with a standard, said verifying comprising:
   performing reinitialization with certification on a test disc containing predetermined defect information and test reference DMA information using the recording and reproducing apparatus to generate test information, and
   comparing the test information with reference test information to determine a verification of the recording and reproducing apparatus, the verification indicating that the uncertified recording and reproducing apparatus is compliant with the standard.

92. The method of claim 91, wherein the comparing comprises checking a structure of a DMA, a disc definition structure (DDS) of the DMA, a primary defect list (PDL) structure and a secondary list (SDL) structure of the DMA, which form the test information.

93. A disc recording and reproducing apparatus for recording and reproducing information on an optical disc, comprising:
   a light source to emit a light;
   a focusing element to focus the light onto the optical disc to record and reproduce the information; and
   a controller to control said light source, said controller being verified to update and generate defect management area (DMA) information by
   performing reinitialization with certification on a test disc containing predetermined defect information and test reference DMA information using the recording and reproducing apparatus to generate test information, and
   comparing the test information with reference test information to determine the verification of the recording and reproducing apparatus.

94. The disc recording and reproducing apparatus of claim 93, wherein the comparing comprises checking a structure of a DMA, a disc definition structure (DDS) of the DMA, a primary defect list (PDL) structure and a secondary list (SDL) structure of the DMA, which form the test information.

95. A disc recording and reproducing apparatus for recording and reproducing information on an optical disc:
   a light source to emit a light;
   a focusing element to focus the light onto the optical disc for recording and reproducing the information; and
   a controller to control said light source and to update and generate defect management area information after performing reinitialization with certification on the optical disc so that the defect management information is compliant with a standard.

96. The disc recording and reproducing apparatus of claim 95, wherein the controller checks a structure of a DMA, a disc definition structure (DDS) of the DMA, a primary defect list (PDL) structure and a secondary list (SDL) structure of the DMA, which form the test information.

97. The method of claim 16, wherein the verifying of the DDS further comprises checking whether remaining reserved areas have a predetermined value.

98. The method of claim 18, wherein the verifying of the PDL structure comprises checking whether an unused area is a predetermined value.

* * * * *

UNITED STATES PATENT AND TRADEMARK OFFICE
CERTIFICATE OF CORRECTION

PATENT NO.    : 6,785,839 B2                                                       Page 1 of 1
DATED         : August 31, 2004
INVENTOR(S)   : Jung-wan Ko et al.

It is certified that error appears in the above-identified patent and that said Letters Patent is hereby corrected as shown below:

Column 13,
Line 32, change "0" to -- 0b --.

Column 18,
Line 14, change "form" to -- from --.

Signed and Sealed this

Eighteenth Day of January, 2005

JON W. DUDAS
*Director of the United States Patent and Trademark Office*